United States Patent
Wolff et al.

(10) Patent No.: US 12,552,449 B2
(45) Date of Patent: Feb. 17, 2026

(54) PANTOGRAPH-BASED VEHICLE GUIDANCE SYSTEM AND METHOD

(71) Applicant: Transportation IP Holdings, LLC, Norwalk, CT (US)

(72) Inventors: Jeffrey John Wolff, Erie, PA (US); James Ghofulpo, Erie, PA (US); Rekha Doddarangaiah Prasad, Warrendale, PA (US); Henry Todd Young, Erie, PA (US); Timothy Brown, Erie, PA (US); Jennifer Sobierajski, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 118 days.

(21) Appl. No.: 18/531,319

(22) Filed: Dec. 6, 2023

(65) Prior Publication Data
US 2024/0246603 A1 Jul. 25, 2024

Related U.S. Application Data

(60) Provisional application No. 63/480,587, filed on Jan. 19, 2023.

(51) Int. Cl.
*B60L 5/24* (2006.01)
*B60L 5/28* (2006.01)
*B60Q 1/00* (2006.01)
*B62D 6/00* (2006.01)

(52) U.S. Cl.
CPC ............ *B62D 6/001* (2013.01); *B60L 5/24* (2013.01); *B60L 5/28* (2013.01); *B60Q 1/00* (2013.01); *B60L 2200/40* (2013.01); *B60L 2240/10* (2013.01); *B60L 2250/16* (2013.01)

(58) Field of Classification Search
CPC .............. B60L 5/26; B60L 5/24; B62D 6/001
See application file for complete search history.

(56) References Cited

U.S. PATENT DOCUMENTS

| | | | |
|---|---|---|---|
| 3,509,527 A | 4/1970 | Oakes et al. | |
| 2011/0094840 A1* | 4/2011 | Sakita | B60L 53/12 701/119 |
| 2013/0018766 A1* | 1/2013 | Christman | B60L 53/65 191/64 |

(Continued)

FOREIGN PATENT DOCUMENTS

CZ 103894 A3 11/1995

OTHER PUBLICATIONS

European Search Report dated Jun. 7, 2024 for corresponding European Patent Application No. 23218462.2.

Primary Examiner — Long T Tran
(74) Attorney, Agent, or Firm — K&L Gates LLP (57) ABSTRACT

A vehicle guidance system and method includes at least one guidance sensor configured to mount on or adjacent to a pantograph along a lateral width of the pantograph. The pantograph installs on a vehicle and conducts electrical energy from a conductive pathway as the vehicle travels along a route. The vehicle guidance system and method includes a controller that receives one or more sensor signals generated by the at least one guidance sensor and determines a lateral position of the conductive pathway relative to the pantograph based on the one or more sensor signals.

18 Claims, 5 Drawing Sheets

(56) References Cited

U.S. PATENT DOCUMENTS

| | | | |
|---|---|---|---|
| 2014/0027229 A1* | 1/2014 | Tojima | B60M 7/00 |
| | | | 191/64 |
| 2014/0041951 A1* | 2/2014 | Tojima | B60L 3/0023 |
| | | | 180/2.1 |
| 2014/0138200 A1* | 5/2014 | Dronnik | B60L 5/36 |
| | | | 191/59.1 |
| 2016/0090007 A1* | 3/2016 | Buehs | B60L 5/36 |
| | | | 191/33 R |
| 2016/0375796 A1* | 12/2016 | Gruenjes | B60M 1/22 |
| | | | 191/33 R |
| 2017/0371350 A1* | 12/2017 | Engdahl | G01C 21/005 |
| 2020/0378750 A1* | 12/2020 | Watanabe | B60L 5/20 |
| 2021/0347264 A1 | 11/2021 | Blase et al. | |
| 2022/0144116 A1* | 5/2022 | Chun | H02J 7/0042 |
| 2023/0251295 A1* | 8/2023 | Willey | B60L 3/00 |
| | | | 324/503 |
| 2023/0302913 A1* | 9/2023 | Prasad | B60L 5/00 |

* cited by examiner

PANTOGRAPH-BASED VEHICLE GUIDANCE SYSTEM AND METHOD

CROSS-REFERENCE TO RELATED APPLICATIONS

This application is a non-provisional conversion of, and claims priority to, U.S. Provisional Patent Application No. 63/480,587, which was filed on Jan. 19, 2023, and the entire disclosure of which is incorporated herein by reference.

BACKGROUND

Technical Field

The subject matter described herein relates to a system and method for guiding movement of vehicles that are electrically powered from off-board power sources via pantographs.

Discussion of Art

Some vehicles include pantographs that electrically connect to conductive pathways that extend along routes traveled by the vehicles. The conductive pathway may be a catenary power line that is suspended above the vehicle. Through an electrical connection between the pantograph and the conductive pathway, electrical power can be transferred between the vehicle and an off-board power source, even as the vehicle travels along the route. The vehicle may use the electrical power that is received via the pantograph to propel the movement of the vehicle along the route and/or to charge one or more onboard battery modules.

A pantograph system can mount to the roof of a vehicle above the cab that houses the operator of the vehicle. It may be difficult or impossible for the operator in the cab to see the pantograph. As a result of the obstructed view, the operator may not be able to determine a state of the pantograph, such as whether the pantograph is extended or retracted. In addition, the vehicle may be able to move laterally relative to the conductive pathway. For example, the vehicle may be a mining truck that travels on a path or road underneath a catenary power line. In this situation, the operator may not be able to determine the position of the pantograph relative to the catenary power line. There is a risk that the vehicle may laterally drift which causes the power line to move beyond an outer edge of the pantograph. This misalignment can not only interrupt the power transfer, but can also cause damage to the power line, insulators, poles, and the like due to snagging, electrical arcing, and/or the like. It may be desirable to have a vehicle guidance system and method that is different from existing systems and methods.

BRIEF DESCRIPTION

In accordance with one example or aspect, a system (e.g., a pantograph-based vehicle guidance system) is provided that includes a set of guidance sensors and a controller including one or more processors. The set of guidance sensors are mounted to a pantograph and spaced apart along a lateral width of the pantograph. The pantograph can be installed on a vehicle and to receive electrical energy from a conductive pathway as the vehicle travels along a route. The controller can receive sensor signals generated by the guidance sensors, and to determine a lateral position of the conductive pathway relative to the pantograph based on the sensor signals.

In accordance with one example or aspect, a method (e.g., for pantograph-based vehicle guidance) is provided that includes receiving sensor signals at a controller including one or more processors. The sensor signals are generated by a set of guidance sensors mounted on a pantograph and spaced apart along a lateral width of the pantograph. The pantograph can be installed on a vehicle and to receive electrical energy from a conductive pathway as the vehicle travels along a route. The method includes determining, via the controller, a lateral position of the conductive pathway relative to the pantograph based on the sensor signals that are received.

In accordance with one example or aspect, a vehicle is provided that includes a pantograph, a set of guidance sensors, a controller including one or more processors, and a display device, which may include a set of lights. The pantograph can receive electrical energy from a conductive pathway as the vehicle travels along a route. The set of guidance sensors is mounted to the pantograph and spaced apart along a lateral width of the pantograph. The controller can receive sensor signals generated by the guidance sensors and to determine a lateral position of the conductive pathway relative to the pantograph based on the sensor signals. The display device may be disposed within a cab of the vehicle and operably connected to the controller. The controller can control the display device to present a visual indicium to an operator of the vehicle based on the lateral position of the conductive pathway relative to the pantograph.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a pantograph-based vehicle guidance system and method that determines status information about a pantograph onboard a vehicle and provides the status information to an operator of the vehicle. In an example, the status information may include a position of the pantograph relative to a conductive pathway along a route that transfers electrical energy with the pantograph. The status information may also include whether the pantograph is in an extended (e.g., raised) position or a retracted (e.g., lowered) position, whether the pantograph is locked in the retracted position, whether the pantograph is at its maximum height position, and/or the like. The system and method may provide the status information as a visual indicium to an operator of the vehicle. For example, visual indicium may be displayed or emitted in a cab of the vehicle that is occupied by the operator. The visual indicium provides the status information to the operator so the operator can determine the pantograph status without actually seeing the pantograph, as the view of the pantograph may be obstructed by the roof and/or other components of the vehicle.

The system and method may provide additional functionality such as automated control of the vehicle and/or the pantograph based on the status information that is determined. For example, in response to determining that the conductive pathway is outside of a central region of the pantograph, the system and method may automatically steer the vehicle to cause the central region of the pantograph to align with the conductive pathway. In other examples, upon detecting that the conductive pathway is near an outer edge of the pantograph, the system and method may automatically retract the pantograph, electrically disconnect the pantograph, change an amount of force exerted on a collector head of the pantograph, and/or the like. These responsive actions may reduce the risk and/or extent of damage attributable to the vehicle drifting off of the conductive pathway.

The pantograph described herein may have several improvements over conventional pantographs. For example, the pantograph may be lighter than conventional pantographs, which enables the pantograph to raise and lower quickly and with limited energy expended. The actuators of the pantograph may be electrically-powered, as opposed to conventional pantographs that are hydraulic and/or pneumatic. The electric control may provide increased precision and quicker response times than the conventional pantographs.

Figure 1:
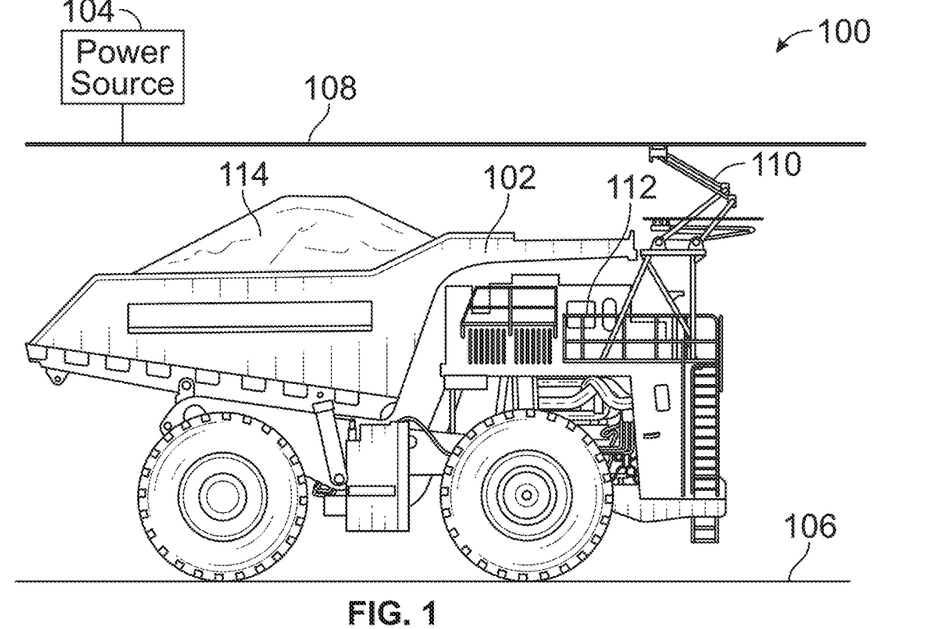
FIG. 1 illustrates a power transfer system that includes a vehicle and an off-board power source.

FIG. 1 illustrates a power transfer system 100 that may include a vehicle 102 and an off-board power source 104. The vehicle travels on a route 106. The off-board power source may include a conductive pathway 108, or trolley, that extends along the route. The conductive pathway may represent a power line (e.g., catenary line) that is held above the route by structural members, such as posts. The vehicle may include at least one pantograph 110 that is installed on the vehicle. The pantograph electrically connects to the conductive pathway to transfer electrical power between the vehicle and the off-board power source. In an example, the vehicle receives electrical power from the off-board power source to power one or more operations of the vehicle. For example, the vehicle may power propulsion of the vehicle along the route using the electrical power that is received via the pantograph. In an example, at least some of the received electrical power may be used to charge an energy storage device (e.g., one or more batteries) onboard the vehicle and/or power one or more auxiliary loads, such as HVAC, lighting, electronics, auxiliary engine, and/or the like. During the transfer of electrical power between the pantograph and the conductive pathway, the vehicle may be stationary or may be in motion. For motive power transfer, the pantograph maintains the electrical connection with the conductive pathway as the vehicle moves along the route.

In an example, the vehicle is an off-highway vehicle (OHV), such as a mining truck. The route may be a road or path, and may be unpaved. The vehicle may include a cab 112 that houses an operator of the vehicle. The vehicle may perform haul cycles with other OHVs in a fleet. The haul cycle may be a repeated cyclical trip that involves transporting a payload 114. The payload may be a natural resource, such as soil, rock, coal, oil, and/or the like. The vehicle may be powered by the off-board power source to receive sufficient energy to complete each haul cycle. In an example, the vehicle may travel along the conductive pathway to charge an onboard energy storage device of the vehicle. Then, the pantograph may be lowered as the vehicle travels away from the conductive pathway to perform a task, such as transporting the payload from a pickup location to a drop off location. In an example, the movement and other operations of the vehicle after disconnecting from the off-board power source may be powered entirely or substantially by the electrical energy stored in the energy storage device. The vehicle may complete the haul cycle by returning to the conductive pathway of the off-board power source to recharge.

The off-highway vehicle is not on a track and can laterally drift relative to the conductive pathway as the vehicle travels along the route. Even if the route is a narrow path or road, the vehicle has some lateral tolerance. The positioning of the vehicle relative to the route can affect the electrical connection between the pantograph and the conductive pathway. The positioning can be lateral, horizontal, or both lateral and horizontal. For example, the pantograph may break the electrical connection with the conductive pathway if the vehicle drifts a sufficient distance away from the conductive pathway. Embodiments of the pantograph-based vehicle guidance system disclosed herein may be integrated onto the vehicle. The guidance system and method monitors and/or tracks the positioning of the pantograph relative to the conductive pathway and performs guidance operations to maintain alignment between the two components to ensure proper power transfer. The lateral positioning is exemplified here, but horizontal positioning may occur on uneven ground or in ruts or holes in the route—and may cause a height adjustment of the pantograph in addition to any lateral adjustments being made.

Figure 2:
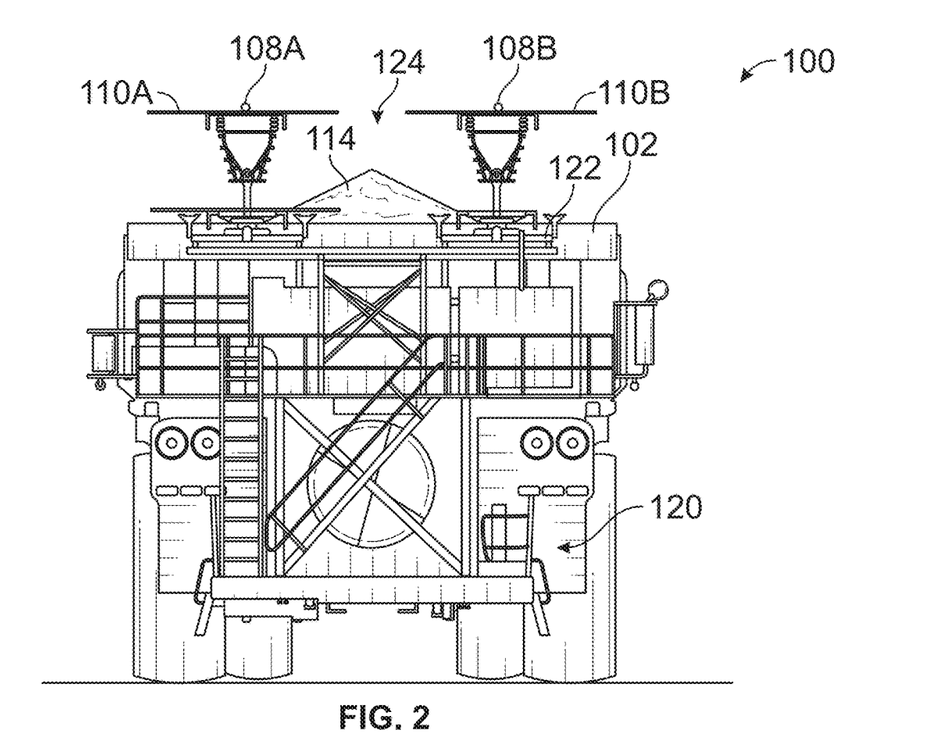
FIG. 2 illustrates a front end of the vehicle in the power transfer system shown in FIG. 1.

FIG. 2 illustrates a front end 120 of the vehicle in the power transfer system shown in FIG. 1. In an example, the vehicle may include two pantographs 110A, 110B laterally spaced apart along a width of the vehicle. The power transfer system may include two conductive pathways 108A, 108B that are laterally spaced apart and extend parallel to each other. The conductive pathways are represented by solid dots in FIG. 2 to represent cross-sectional areas of the conductive pathways. Each of the pantographs aligns with and electrically connects to a different corresponding conductive pathway of the two conductive pathways. Both conductive pathways are disposed directly above the vehicle. For example, the conductive pathways would land on the vehicle if no support members held the conductive pathways up. The conductive pathways are held high enough to avoid contact with the vehicle and the load carried by the vehicle. The two pantographs vertically extend from a roof 122 of the vehicle towards the corresponding conductive pathways. The pantograph and conductive pathway on the left side of the vehicle may be separated from the pantograph and conductive pathway on the right side of the vehicle by a gap 124.

Although the vehicle has two pantographs that electrically connect to two corresponding conductive pathways in the illustrated example, the vehicle may include only one pantograph in other examples. The dual pantograph set-up may provide increased power transfer rates than a single pantograph set-up, but only one pantograph is used to achieve aspects of the inventive subject matter described herein. Although the vehicle described in FIGS. 1 and 2 is an OHV, the pantograph-based vehicle guidance system and method described herein may be implemented on various different types of vehicles that include pantographs. The guidance system and method may be integrated onto buses, road-based trucks (with or without trailers), agricultural vehicles, marine vessels, and/or the like. Some aspects of the inventive subject matter may be implemented on rail vehicles that travel on tracks.

Figure 3:
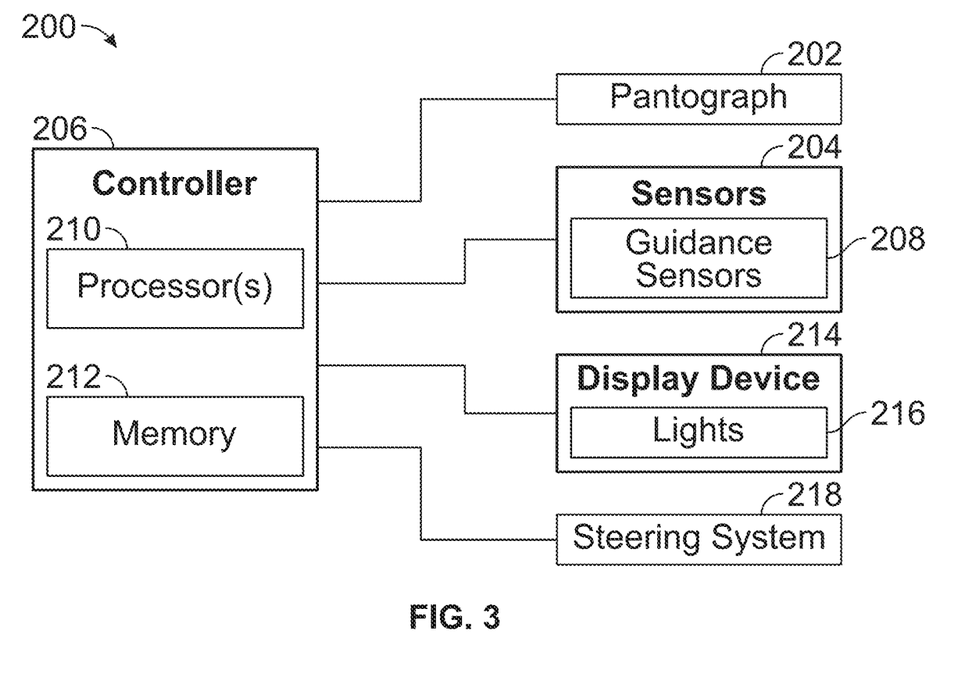
FIG. 3 is a block diagram of a pantograph-based vehicle guidance system according to an embodiment.

FIG. 3 is a block diagram of a pantograph-based vehicle guidance system 200 according to an embodiment. The pantograph-based vehicle guidance system (referred to herein as guidance system) is integrated onto a vehicle, such as the vehicle shown in FIGS. 1 and 2. The guidance system may include a pantograph 202, sensors 204, and a controller 206, among other components. Optionally, the guidance system may include additional components that are not shown in FIG. 3 and/or may lack at least one of the components shown in FIG. 3.

The pantograph is installed on the vehicle and is moveable relative to the vehicle to extend towards a conductive pathway and retract away from the conductive pathway. The sensors include a set of guidance sensors 208 that are mounted to the pantograph. The guidance sensors communicate with the controller, and are used to determine an alignment of the conductive pathway relative to the pantograph. The controller is communicatively connected to the guidance sensors, the pantograph, and the other components of the guidance system shown in FIG. 3. The controller may be communicatively connected to the various components via wired and/or wireless communication pathways. For example, the controller may receive sensor signals generated by the guidance sensors. Based on the sensor signals, the controller may determine a lateral position of the conductive pathway along a width of the pantograph. In response, the controller may perform one or more actions using at least some of the other components of the guidance sensors, as described herein. The controller may perform the actions by generating control signals that are communicated via wired pathways, or alternatively are wirelessly communicated, to the intended recipient component.

The controller represents hardware circuitry that may include and/or is connected with one or more processors 210 (e.g., one or more microprocessors, integrated circuits, microcontrollers, field programmable gate arrays, etc.). The controller may include and/or is connected with a tangible and non-transitory computer-readable storage medium (e.g., data storage device), referred to herein as memory 212. The memory stores program instructions (e.g., software) that are executed by the one or more processors to perform the controller operations described herein.

Additional components of the guidance system shown in FIG. 3 include a display device 214, the display device may be or may include a set of lights 216, and a steering system 218. In one example, the display device may include a display screen and associated hardware for presenting graphical user interfaces (GUIs), images, video, and/or the like. The display device may be positioned for viewing by an operator of the vehicle. For example, the display device may be installed within a cab of the vehicle. In an example, the display device may be a personal computing device (e.g., smartphone, tablet computer, wearable computer, and/or the like) that is carried by the operator. A suitable set of lights may include multiple individual lights arranged in a set. The lights may be LED lights, fluorescent or compact fluorescent lights (CFL), halogen lights, or incandescent lights. The lights may be arranged in a line or row. The lights may be spaced apart at different locations along the length of the row. The length of the row may represent the lateral width of the pantograph. The lights in the set are controlled by the controller, which selects and/or modifies timing and properties of the light emitted by the lights. The set of lights may be installed in the cab of the vehicle or another location that is visible to an operator of the vehicle.

In an example, the controller controls the display device to present a visual indicium to the operator. The controller formulates the visual indicium based on the lateral position of the conductive pathway relative to the pantograph, as determined based on the guidance sensors. For example, the visual indicium provides information to the operator about the lateral position of the conductive pathway relative to the pantograph. This determination may be done without the operator visually observing the conductive pathway and the pantograph. In a first example, the guidance system may include both the display screen and a set of the lights, and the controller controls both the display screen and the lights to present the visual indicium. In a second example, the guidance system may include both the display screen and the lights, and the controller only controls the display screen or only the lights, but not both, to present the visual indicium. In another example, the guidance system may include the display screen but not the set of lights, and the controller controls the display screen to present the visual indicium. In a fourth example, the guidance system may include the set of lights but not the display screen, and the controller controls the lights to present the visual indicium. The display device may indicate the degree to which the vehicle, and thus the pantograph, is or is not centered on the conductive pathway. The display device, via the sensor signals, may indicated the quality of the contact between the pantograph and the conductive pathway, and may indicate the voltage and/or current available on the conductive pathway.

The steering system may control the movement direction at which the vehicle travels. The steering system may include steering actuators that are coupled via mechanical linkages to wheels of the vehicle. The steering actuators control the orientation of the wheels. The controller may generate control signals that are conveyed to the steering actuators to steer the vehicle along the route. In an example, the controller may automatically steer the vehicle to modify the direction of movement without operator input. For example, the controller may adjust the direction of movement to correct for lateral drift before the pantograph electrically disconnects from the conductive pathway (e.g., before the conductive pathway "falls off" the lateral end of the pantograph). This adjustment may be done automatically.

Figure 4:
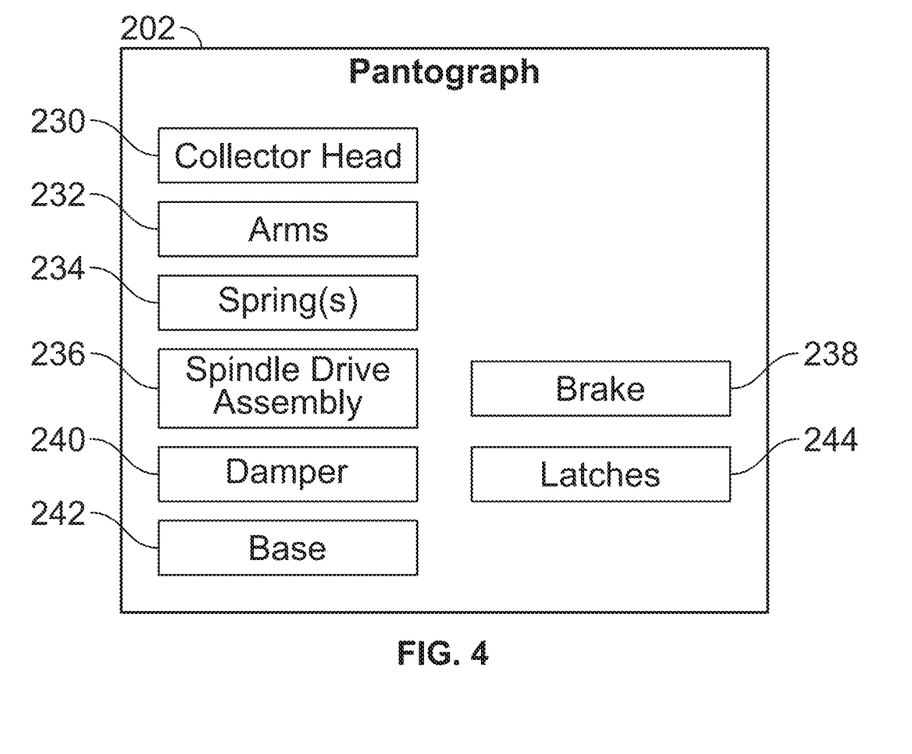
FIG. 4 is a block diagram of a pantograph of the pantograph-based vehicle guidance system according to an embodiment.

FIG. 4 is a block diagram of the pantograph of the guidance system according to an embodiment. The pantograph may include a collector head 230, arms 232, one or more springs 234, a spindle drive assembly 236, a brake 238, a damper 240, a base 242, and latches 244. The collector head is the portion of the pantograph that electrically connects to the conductive pathway. The collector head may include at least one electrically conductive strip. A suitable strip may be composed of carbon. The strip is elongated and oriented on the vehicle to be approximately perpendicular to the conductive pathway (e.g., catenary power line) when electrically connected to the conductive pathway. The collector head may include two electrically conductive strips, which are parallel and spaced apart along a length of the pantograph (e.g., length of the vehicle).

The base and the arms form the structural framework of the pantograph. For example, the base mounts to the vehicle, and the arms link the collector head to the base. The arms may connect to the base, the collector head, and to one another via pivot joints. The movement of the arms about the pivot joints extends and retracts the collector head relative to the vehicle. The arms and/or base may be composed of a relatively light metal material, such as aluminum. The lightweight material of the arms may reduce the energy required to extend and/or retract the pantograph. In an example, the one or more springs apply a spring force on the collector head and/or the arms. In an example, the pantograph may include multiple springs. In an example, when the pantograph is in the extended or raised position, one or more of the springs may apply tension that pulls the pantograph towards the retracted or lowered position. In another example, one or more of the springs may bias the pantograph towards the extended position. The springs enable the collector head to remain in intimate contact or proximity of the conductive pathway even as the height of the conductive pathway varies between support poles.

The spindle drive assembly may include at least a motor and a gear box that control the extension and retraction of the pantograph. The controller may actuate the spindle drive assembly to extend the pantograph to the extended position and to retract the pantograph to the retracted position. The spindle drive assembly may be indirectly connected to the collector head via one of the springs. The motor applies tension to the spring which causes a force imbalance in the springs. The force imbalance raises and lowers the collector head. In an example, the motor is electrically powered. The brake selectively retains the pantograph in place in a position, such as in the retracted position, the (fully) extended position, or an intermediate position between retracted and (fully) extended position. The brake may be integrated with the spindle drive assembly. For example, the brake may be on a shaft of the spindle drive assembly. The brake blocks activity of the spindle drive assembly when the brake is engaged or active. In an example, the brake must be released or inactive before the spring drive assembly can move the pantograph in either direction. Stated differently, the brake may prohibit movement of the pantograph relative to the vehicle unless deactivated by the controller.

In an example, the spindle drive assembly and the brake operate based on electrical power. If power is lost to the guidance system, the pantograph coasts downward to the retracted position because the brake automatically releases and forces (e.g., gravity and/or spring tension) retract the pantograph. The gear box of the spindle drive assembly may enable the pantograph to coast at a relatively constant, controlled speed towards the retracted position due to the gears. The controlled speed of descent provided by the gear box may be sufficiently slow to avoid damaging components of the pantograph and/or vehicle during the drop and sufficiently fast to allow the pantograph to quickly separate from the conductive pathway in the event of an emergency condition. The pantograph may also include a damper designed to slow the extension and retraction movements of the pantograph.

The pantograph may include latches that secure the pantograph in the retracted position. The latches may be coupled to a latch actuator that is actively controlled to lock and/or release the latches. The latch actuator may include a motor. For example, upon determining that the pantograph is in the retracted position, the latch actuator may lock the latches to secure the pantograph. The latch actuator may release the latches to enable the spindle drive assembly and/or springs to extend (e.g., raise) the pantograph.

Figure 5:
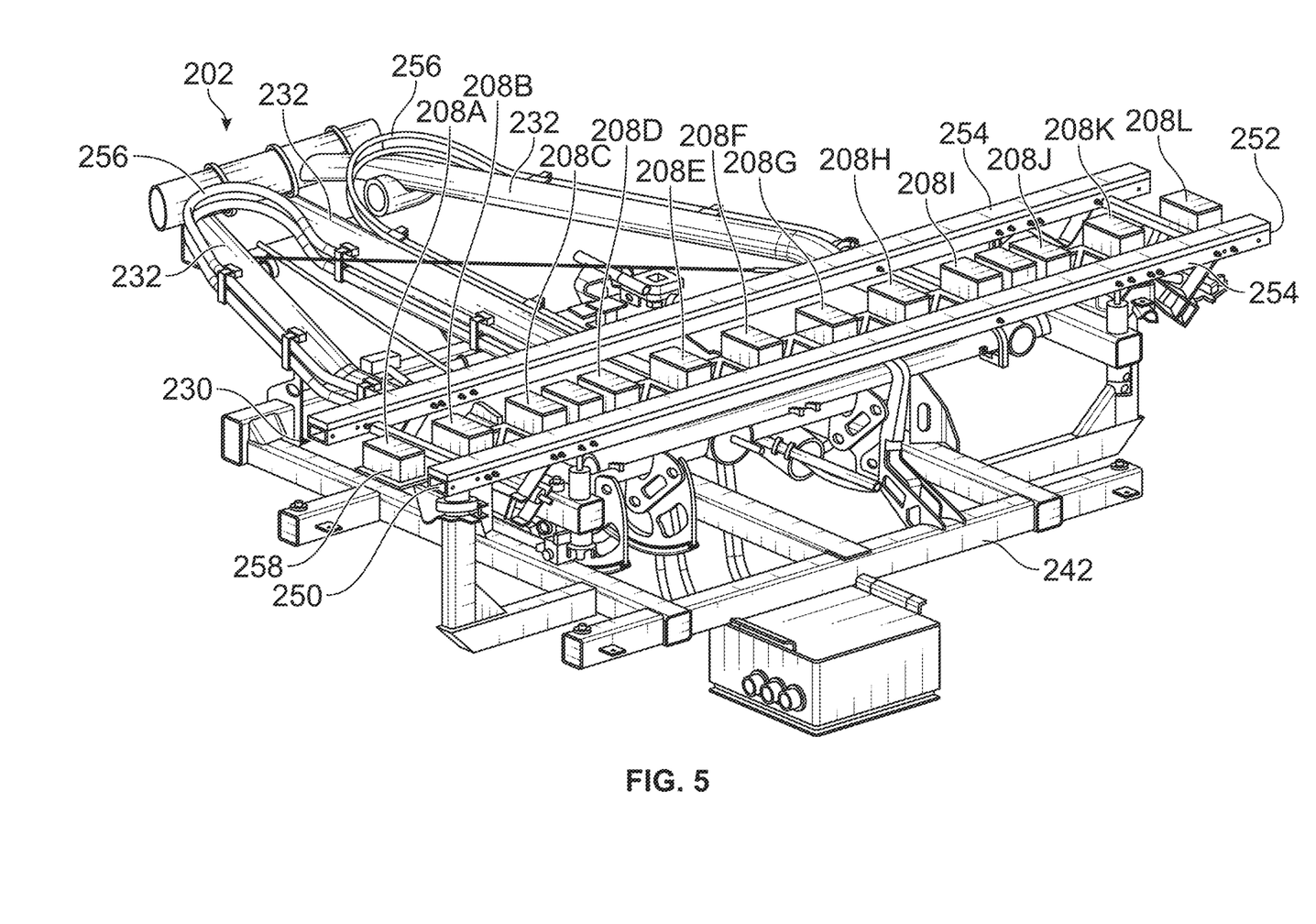
FIG. 5 illustrates some components of the pantograph shown in FIGS. 3 and 4.

FIG. 5 illustrates some components of the pantograph shown in FIGS. 3 and 4. The pantograph may be one of the pantographs shown in FIGS. 1 and 2. The pantograph is depicted in the retracted position, such that the arms are folded in at the base. The pantograph laterally extends a width from a first edge 250 (or end) to a second edge 252 (or end) that is opposite the first edge. The first and second edges may be defined by respective edges or ends of electrically conductive strips 254 of the collector head. The collector head has two electrically conductive strips in the illustrated example, but may have only one or more than two in other examples. Power cables 256 electrically connect to the conductive strips and are routed along the arms to the base. The power cables convey the electrical power that is received from the conductive pathway and/or supplied to the conductive pathway during a power transfer operation.

During the power transfer operation, the vehicle positions itself such that the conductive pathway aligns between the first and second edges of the pantograph. The guidance system described herein monitors the position of the conductive pathway relative to the pantograph and may perform one or more actions to keep the conductive pathway in alignment with the pantograph. The guidance system may significantly reduce the risk of the conductive pathway moving outside of the lateral width of the pantograph (e.g., falling off one of the edges), which would break the electrical connection and could damage one or more components.

The guidance sensors of the pantograph may be spaced apart from one another along the lateral width of the pantograph between the first and second edges. For example, the guidance sensors may be aligned in a row across the width. The pitch, or spacing, between different pairs of adjacent guidance sensors in the row may be approximately constant. In the illustrated example, the pantograph has twelve guidance sensors 208A-L. The guidance sensors may be housed in individual enclosures (e.g., boxes) 258. The guidance system may have more or less than twelve guidance sensors in other examples. In an example, the guidance sensors are inductive sensors. The inductive sensors detect the presence or proximity of the conductive pathway (e.g., catenary power line). The guidance sensors may be non-contact inductive sensors that operate without physically contacting the conductive pathway. For example, the sensors may detect the presence or proximity by inductively monitoring one or more electrical characteristics of the conductive pathway, such as voltage. For example, when the conductive pathway is closer to a respective guidance sensor, that guidance sensor may measure a greater voltage from the conductive pathway than when the conductive pathway is farther from the guidance sensor. An output, or sensor signal, of each guidance sensor may depend on a proximity of the conductive pathway to the respective guidance sensor. For example, the sensor signal may have a first amplitude or voltage when the conductive pathway is closer to the respective guidance sensor, and a second amplitude or voltage when the conductive pathway is farther from the guidance sensor. The first amplitude or voltage may be greater than the second amplitude or voltage.

The value or property of the sensor signal is interpreted by the controller to determine the relative proximity of the conductive pathway to the corresponding guidance sensor that generated the sensor signal. The controller may analyze sensor signals generated by each of the guidance sensors to determine the lateral position of the conductive pathway relative to the pantograph. The controller may compare the values or properties of the sensors signals generated by the guidance sensors at a given time or time period, and determine a subset of the guidance sensors that is most proximate to the conductive pathway based on the comparison of the values or properties. For example, the controller may identify two guidance sensors that generated sensor signals that had the greatest amplitudes or voltages of all of the sensor signals during that time or time period. The sensor signals may have identification indicators embedded in the signals that enable identifying which guidance sensor generated each sensor signal.

Upon identifying the two guidance sensors, the controller may access and consult a table or other database that provides the location of the two guidance sensors along the width of the pantograph. The table or database may be stored in the memory. In an example, the two guidance sensors may be sensors 208C and 208D. The controller can then determine, based on the table, that the sensors most proximate to the conductive pathway are disposed next to each other and are the third and fourth sensors in the row from the first edge 250. The controller may determine the lateral position of the conductive pathway, at that given time or period, as being located between the third and fourth guidance sensors 208C and 208D. The location of each guidance sensor is fixed and a value representing each location may be stored in the memory. As such, the controller may identify the lateral position that is determined as a numerical value.

In an example, the sensor signals may be proportional to the proximity of the conductive pathway to the corresponding guidance sensors. The use of a substantial number of guidance sensors, such as six, eight, ten, twelve, or fourteen, with the proportional sensor responses may enable the controller to determine the lateral position of the conductive pathway with significant precision. For example, the controller may be able to determine whether the conductive pathway is closer to the third guidance sensor 208C or the fourth guidance sensor 208D based on differences between the sensor outputs generated by the third and fourth guidance sensors. The embodiments described herein could be performed with fewer guidance sensors, although the precision of the determined lateral position may be reduced.

In an example, the guidance sensors may be installed only on one pantograph, even if a vehicle has at least two pantographs. For example, the second pantograph is typically in a fixed position relative to the first pantograph, so there may be no need for the additional cost and complexity of installing guidance sensors on both pantographs.

Figure 6:
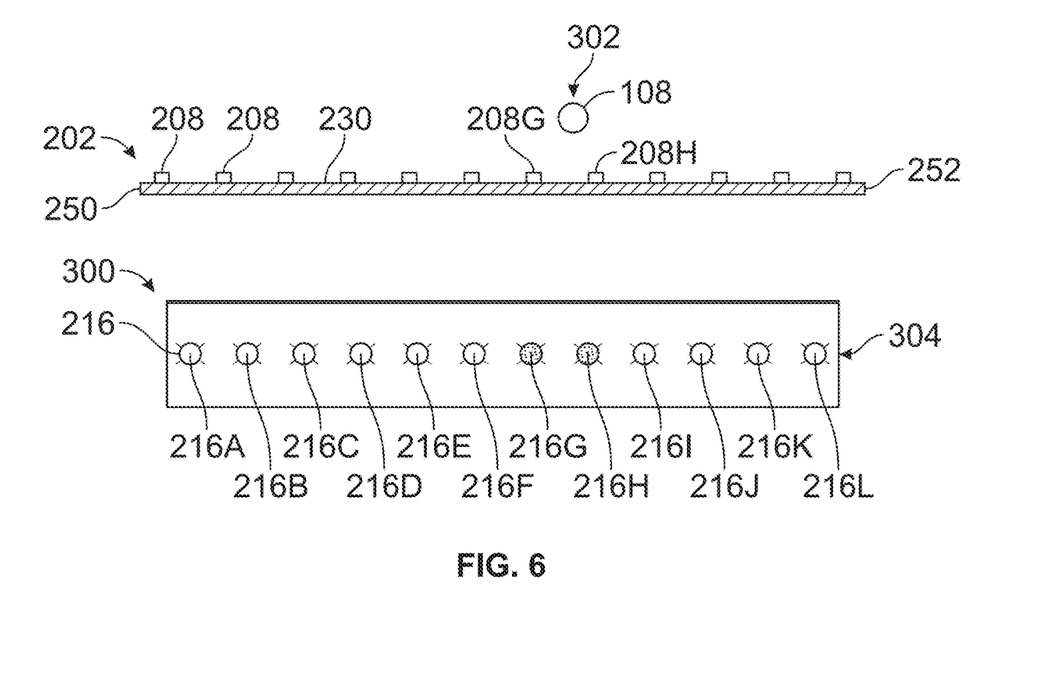
FIG. 6 is a schematic diagram showing a first visual indicium presented by the pantograph-based vehicle guidance system based on a first lateral position of the conductive pathway relative to the pantograph according to an embodiment.

FIG. 6 is a schematic diagram showing a first visual indicium 300 presented by the guidance system based on a first lateral position 302 of the conductive pathway relative to the pantograph according to an embodiment. FIG. 6 shows only the collector head and the twelve guidance sensors of the pantograph. In the illustrated example, the controller determines that the lateral position of the conductive pathway is between the fifth and sixth guidance sensors away from the second edge 252. The controller controls the display device (shown in FIG. 3) to present the visual indicium to an operator of the vehicle based on the lateral position. In FIG. 6, the visual indicium is presented by the set of lights.

In an example, the set of lights may include one light corresponding to each of the guidance sensors, such that each light is associated with a different guidance sensor. For example, the set may include twelve lights 216A-216L in FIG. 6 to match the twelve guidance sensors. The lights are arranged in a row and are spaced apart along the length of the row, similar to the spacing of the guidance sensors. The lights may be installed within a cab of the vehicle, such as on or above a control panel used to control operation of the vehicle. The controller selectively activates one or more of the lights at a time to present the visual indicium.

In an example, the controller generates the visual indicium to indicate, to the operator observing the visual indicium, the lateral position of the conductive pathway relative to the pantograph. The controller may select which lights to activate for presenting the visual indicium based on which guidance sensors are closest to the conductive pathway. For example, the controller may only light a subset of the lights, where the lights in the subset are associated with the guidance sensors that are closest to the conductive pathway. In the illustrated example, the controller controls the fifth and sixth lights 216G, 216H from the right end 304 of the row to emit light and controls the other ten lights to not emit light. The controller determines the lateral position of the conductive pathway to be between the fifth and sixth guidance sensors from the right edge of the pantograph. The controller then uses the fifth and sixth lights, which are associated with the fifth and sixth guidance sensors, to present the visual indicium at the exclusion of the other lights. The operator that observes the set of lights can interpret the lateral position of the conductive pathway relative to the pantograph based on which light or lights is operating to emit light at a given instant. In an alternative example, the visual indicium may be presented by only the fifth light 216H closest to the right end of the row because the conductive pathway is determined to be closest to the fifth guidance sensor 208H.

In an example, some of the lights in the row may emit light having different properties than other lights in the row. For example, different lights may emit different wavelengths of light. The four outermost lights 216A, 216B, 216K, 216L may emit red light, the four innermost lights 216E-216H may emit green light, and the outer four lights 216C, 216D, 216I, 216J may emit yellow light. In the illustrated example, the light emitted by the fifth and sixth lights from the right as the visual indicium may be green.

In these example the controller controls the location of the emitted light based on the determined lateral position. In other examples, instead of or in addition to controlling the location of the emitted light as the visual indicium, the controller may present the visual indicium by selecting other characteristics, such as the shape, color, timing, and/or intensity (e.g., brightness) of the light that is emitted. In one example, all of the lights may emit light, and the controller provides the visual indicium by selectively varying the wavelength and/or intensity of the light emitted by different lights in the row. For example, the fifth and sixth lights may emit light that has a lower wavelength (greater frequency) and/or a greater intensity than the light emitted by the other lights in the row. The controller may phase the wavelengths and/or intensities of the light emitted by different lights along the length of the row to provide a cascading or tiered effect which culminates at the lights or lights associated with the determined lateral position of the conductive pathway.

The controller may update the visual indicium over time. For example, in response to the vehicle drifting left or right relative to the conductive pathway as the vehicle travels along the conductive pathway, the controller determines a change in the lateral position of the conductive pathway relative to the pantograph. Based on the updated lateral position, the controller may modify the visual indicium to reflect the updated lateral position. For example, relative to the previous visual indicium, the controller may modify a location, shape, color (e.g., wavelength), timing, and/or intensity of the visual indicium to indicate the detected change in the lateral position. The controller may update the visual indicium periodically, such as every second, every two seconds, every five seconds, every ten seconds, or the like.

Figure 7:
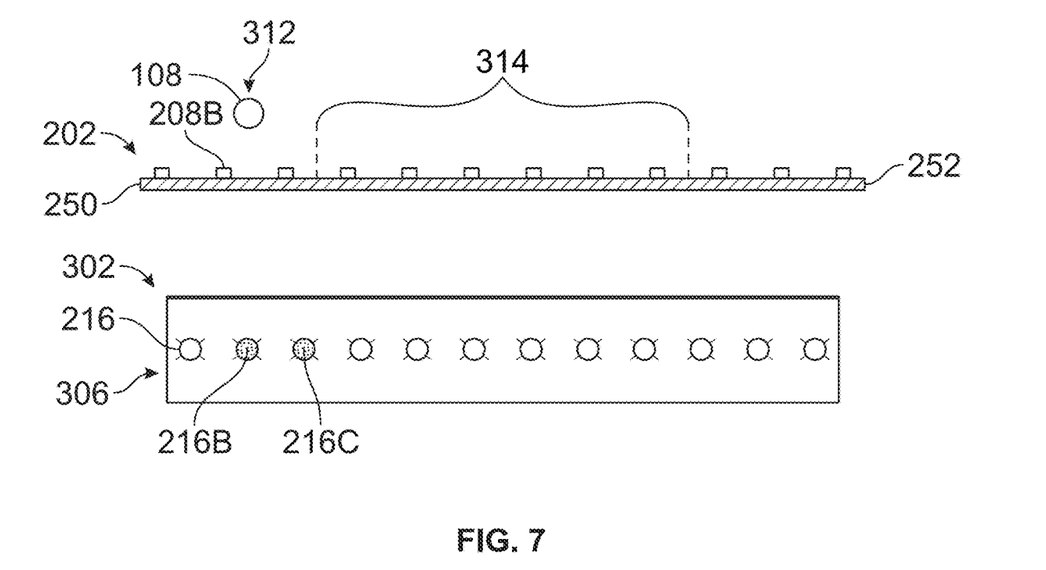
FIG. 7 is a schematic diagram showing a second visual indicium presented by the pantograph-based vehicle guidance system based on a second lateral position of the conductive pathway relative to the pantograph according to an embodiment.

FIG. 7 is a schematic diagram showing a second visual indicium 310 presented by the guidance system based on a second lateral position 312 of the conductive pathway relative to the pantograph according to an embodiment. The controller controls the set of lights to present the second visual indicium at a different time than the first visual indicium. At the time shown in FIG. 7, the controller determines that the lateral position of the conductive pathway relative to the pantograph is at the second guidance sensor 208B from the first edge 250. Part of the conductive pathway is between the second and third guidance sensors from the first edge. The controller may control the lights to present the second visual indicium, indicative of the second lateral position, by controlling at least the second light 216B from a left end 306 of the row of lights to emit light. In an example, the controller may activate both the second light and the third light 216C from the left end to emit light, and the other ten lights in the row are inactive. In the example described above, the second light from the left may emit a red colored light, and the third light may emit a yellow colored light.

In an alternative example, rather than indicating the lateral position of the conductive pathway relative to the pantograph, the controller generates the visual indicium, based on the lateral position that is determined, to indicate a lateral direction for the vehicle to move in order to center the conductive pathway relative to the pantograph. With reference to FIG. 7 in which the lateral position is proximate to the first or left edge, the controller may generate the visual indicium to indicate a direction towards the right end of the row of lights. For example, the controller may vary the timing at which the lights in the row emit light in sequence in order for the lights to chase each other in the rightward direction. This visual indicium indicates to the operator that the operator should steer the vehicle towards the right in order for the conductive pathway to more centrally align with the pantograph. In another example, the set of lights may include one or more lights in the shape of a left arrow and one or more lights in the shape of a right arrow. The controller activates the left arrow light(s) if the vehicle should drift left, and the controller activates the right arrow light(s) if the vehicle should drift right.

Although FIGS. 6 and 7 show the set of lights, the controller may control the display device to present the visual indicium to the operator instead of, or in addition to, the lights. For example, the display device may display virtual lights that resemble the physical light emitting devices shown in FIGS. 6 and 7. In other examples, the visual indicium may be presented as a text-based message that states the lateral position of the conductive pathway and/or instructs which direction the operator should steer the vehicle to center the conductive pathway on the pantograph. Suitable visible indicia may include directional arrows in one example.

The second lateral position of the conductive pathway in FIG. 7 is relatively close to the first edge of the pantograph. In an example, the controller may take one or more actions to notify the operator, prepare for the conductive pathway moving beyond the first edge, and/or prevent the conductive pathway from moving beyond the first edge. The controller may take the one or more actions in response to determining that the lateral position is outside of a central region 314 of the pantograph and/or within a designated proximity of either of the first or second lateral edges of the pantograph. For example, the bounds of the central region and/or the designated proximity distances may be stored in the memory. Upon determining the lateral position, the controller may compare the lateral position to the stored boundaries of the central region and/or the stored proximity distances to determine if the lateral position is within any of these areas. If the lateral position is within the central region, the pantograph is properly aligned with the conductive pathway and no remedial actions are necessary. In the illustrated example, the second lateral position is outside of the central region and/or within a designated proximity distance of the first edge 250 of the pantograph. The controller takes one or more actions in response.

In a first example, the controller may automatically steer the vehicle to cause the central region of the pantograph to align with the conductive pathway. For example, the controller may generate a control signal that is conveyed to the steering system of the vehicle. The control signal may cause the vehicle to turn in a direction such that a center of the pantograph moves towards the conductive pathway. Once the updated lateral position of the conductive pathway is within the central region, as determined based on the guidance sensor signals, the controller may straighten out the vehicle and then cease auto-steering the vehicle.

In a second example, the controller may take one or more actions to notify the operator about the conductive pathway being close to the first edge of the pantograph. For example, the controller may generate the second visual indicium by flashing the second and third lights in the row, rather than keeping them continuously active. The controller may generate a control signal that is conveyed to a speaker or other audio device to cause the speaker/audio device to emit an audible warning or alert. The controller may generate an alert in the form of a message that is communicated to the display device, which displays the message. In an example, the controller may notify the operator via the alert(s), and then automatically steer the vehicle as described above if the operator does not manually turn the vehicle within a designated amount of time after sending the notification.

The controller may prepare for the conductive pathway moving beyond the first edge (also referred to as driving off the line) by taking one or more actions to reduce or avoid damage caused by that event occurring. For example, in response to determining that the second lateral position is outside of the central region and/or within the designated proximity distance of the first edge, the controller may pre-unload the spindle drive assembly by changing an amount of force exerted by the spindle drive assembly on the spring. For example, before driving off the line, the controller may disengage or deactivate the brake, and then actuate the drive motor to start releasing the tension that holds the collector head in the extended or raised position without yet retracting the pantograph from the extended position.

In another example, the controller may automatically retract the pantograph towards the vehicle and away from the conductive pathway. For example, if the lateral position is at the outermost guidance sensor in the row, closest to one of the edges, then the controller may disengage the brake and activate the spindle drive assembly to begin retracting the pantograph away from the conductive pathway, before the conductive pathway laterally moves beyond the edge. Another example control action is that the controller may electrically disconnect the pantograph from an electrical system onboard the vehicle. For example, the controller may actuate one or more switches onboard the vehicle to disconnect the pantograph from onboard circuitry, the onboard battery, and/or the like. The controller may proactively disconnect the pantograph to prohibit damaging these onboard components in case the pantograph abruptly breaks electrical connection with the conductive pathway.

The controller may control the set of lights and/or the display device to present additional status information to the operator about the pantograph. For example, the controller may generate a different visual indicium, to be presented by the lights and/or display device, that indicates that the vehicle is approaching the end of the length of the conductive pathway. In another example, the controller may generate a visual indicium, such as flashing the lights, if the controller detect a fault and/or a risk of a fault.

In an example, before unlocking the latches that secure the pantograph in the retracted position, the controller may pre-load the pantograph. For example, as the vehicle approaches the beginning of a trolley line, the controller may detect the approaching conductive pathway. For example, the controller may compare GPS location data of the vehicle to a stored location of the beginning of the trolley line and/or may analyze sensor data, such as image data generated by a camera. Upon detecting the approaching conductive pathway, the controller may pre-load the pantograph by controlling the motor of the spindle drive assembly to apply some tension against the latches. Once the latches are unlocked in response to the operator selecting trolley mode (e.g., a raise request), the pre-loaded tension may cause the pantograph to extend to the raised position in less time than if the pantograph was not pre-loaded.

The sensors of the guidance system that are not the guidance sensors may include sensors that monitor the gear box of the spindle drive assembly. For example, the sensors may be position sensors that detect when the gear box is within a designated distance of the end of its driving range. The controller may receive the sensor signals from these sensors, and then notify the operator and/or automatically stop or reverse the spindle motor to avoid run-out (e.g., overextension) of the gear box. Other sensors of the guidance system may monitor when the pantograph is lowered, when the pantograph is at the max height, when the spindle drive is housed, when the spindle drive is extended, when the latches are engaged (e.g., locked), and/or when the latches are disengaged (e.g., unlocked).

Figure 8:
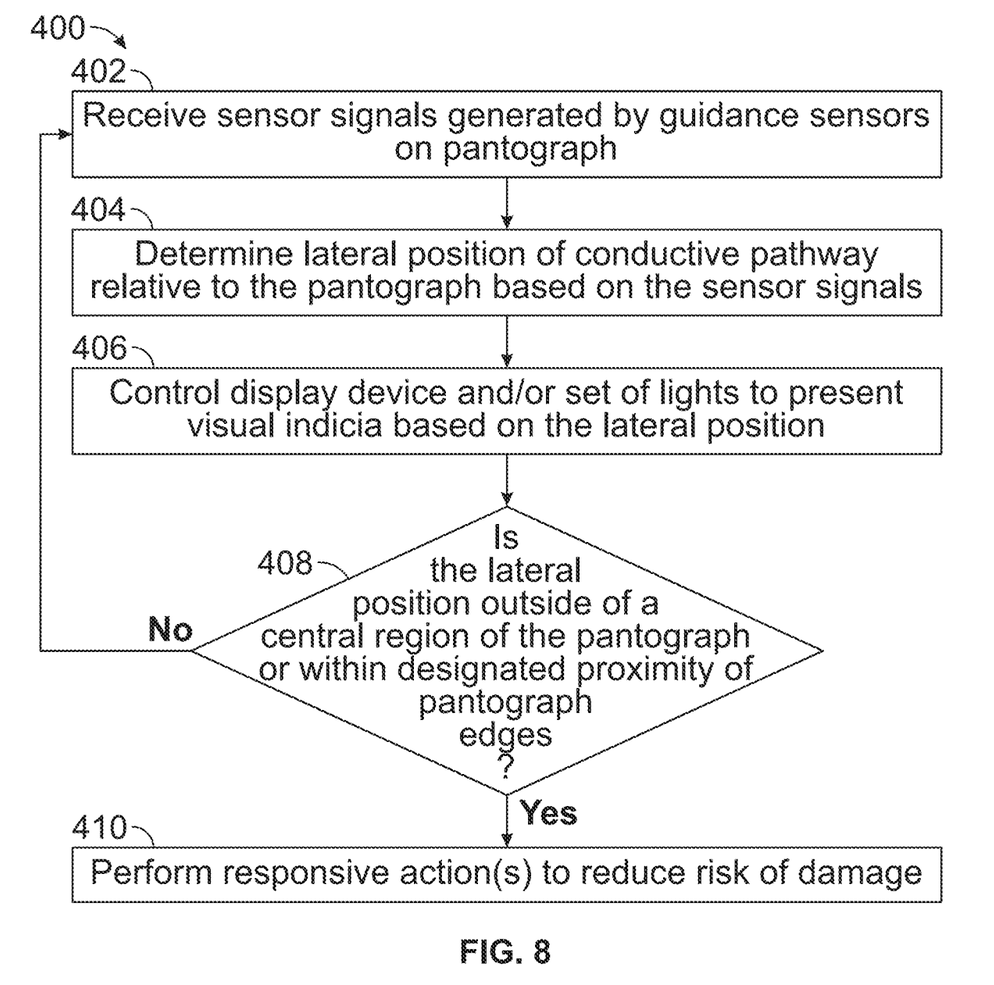
FIG. 8 is a flowchart of a method for pantograph-based vehicle guidance according to an embodiment.

FIG. 8 is a flowchart 400 of a method for pantograph-based vehicle guidance according to an embodiment. The method may be performed in whole or in part by the controller of the guidance system shown in FIGS. 3 through 5. The method optionally may include more steps than shown, fewer steps than shown, and/or different steps than shown in FIG. 8. At step 402, sensor signals generated by a set of guidance sensors are received at a controller. The guidance sensors are mounted on a pantograph and spaced apart along a lateral width of the pantograph. The pantograph is installed on a vehicle and receives electrical energy from a conductive pathway as the vehicle travels along a route.

At step 404, a lateral position of the conductive pathway relative to the pantograph is determined by the controller. The controller determines the lateral position based on the sensor signals that are received from the guidance sensors. At step 406, a display device and/or a set of lights are controlled, by the controller, to present a visual indicium to an operator of the vehicle based on the lateral position. In a first example, the visual indicium may indicate the lateral position of the conductive pathway relative to the pantograph. For example, the set of lights may be controlled to present the visual indicium by the controller selectively activating only a subset of the lights in the set of lights. In a second example, the visual indicium may indicate a lateral direction for the vehicle to move for centering the conductive pathway relative to the pantograph. Regardless, the method may include changing the visual indicium based on a detected change in the lateral position. For example, the controller may modify a location, a shape, a color, a timing, and/or an intensity of the visual indicium based on the detected change in the lateral position.

At step 408, it is determined whether the lateral position of the conductive pathway is outside of a central region of the pantograph and/or is within a designated proximity of a first edge or an opposite, second edge of the pantograph. The controller may compare the determined lateral position to boundary locations of the central region and/or designated edge proximity regions. If the lateral position is inside the central region and/or outside of the designated proximities to the edges, then the method returns to step 402. On the other hand, if the lateral position is outside of the central region and/or within either of the designated edge proximities, then the method advances to step 410.

At step 410, the controller performs one or more responsive actions to reduce the risk of damage. One example responsive action may include generating a control signal that automatically steers the vehicle in a direction to cause the central region of the pantograph to align with the conductive pathway. Other responsive actions may include generating an alert to notify an operator, electrically disconnecting the pantograph from an electrical system onboard the vehicle, and/or retracting the pantograph towards the vehicle and away from the conductive pathway.

In an embodiment, a vehicle guidance system includes at least one guidance sensor and a controller including one or more processors. The at least one guidance sensor may mount on or adjacent to a pantograph along a lateral width of the pantograph. The pantograph may install on a vehicle and conduct electrical energy from a conductive pathway as the vehicle travels along a route. The controller may receive one or more sensor signals generated by the at least one guidance sensor and determine a lateral position of the conductive pathway relative to the pantograph based on the one or more sensor signals. A first guidance sensor of the at least one guidance sensor may be a non-contact inductive sensor that generates one or more sensor signals indicative of a proximity of the conductive pathway to the first guidance sensor. In an example, the conductive pathway may be a catenary line.

The controller may control a display device to present a visual indicium to an operator of the vehicle. The visual indicium may indicate the lateral position of the conductive pathway relative to the pantograph. The display device may include a set of lights. The lights of the set may be spaced apart in a row, and the controller may control the set of lights to present the visual indicium by selectively activating only a subset of one or more of the lights in the row. At least some of the lights in the row may emit different wavelengths of light than other lights in the row.

The controller may control a display device to present a visual indicium to an operator of the vehicle based on the lateral position that is determined. The visual indicium may indicate a lateral direction for the vehicle to move for centering the conductive pathway relative to the pantograph. The controller may control a display device to present a visual indicium to an operator of the vehicle based on the lateral position of the conductive pathway relative to the pantograph. The controller may modify a location, a shape, a color, a timing, and/or an intensity of the visual indicium based on a detected change in the lateral position.

The controller may determine that the lateral position of the conductive pathway is outside of a central region of the pantograph. In response to determining that the lateral position of the conductive pathway is outside of the central region, the controller may generate a control signal that automatically steers the vehicle in a direction to cause the central region of the pantograph to align with the conductive pathway. In response to the controller determining that the lateral position is within a designated proximity of a first edge or an opposite second edge of the pantograph along the lateral width of the pantograph, the controller may (i) generate an alert to notify an operator, (ii) electrically disconnect the pantograph from an electrical system onboard the vehicle, and/or (iii) retract the pantograph towards the vehicle and away from the conductive pathway.

The vehicle guidance system may include the pantograph, which has a spindle drive assembly. The controller may control the spindle drive assembly to change an amount of force exerted by the spindle drive assembly in response to determining that the lateral position of the conductive pathway is within a designated proximity of a first edge or an opposite second edge of the pantograph along the lateral width of the pantograph. The pantograph may include a collector head, the spindle drive assembly, and a brake. The controller may actuate the spindle drive assembly to extend the pantograph to an extended position and to retract the pantograph to a retracted position. The brake may prohibit movement of the pantograph relative to the vehicle unless deactivated by the controller. The spindle drive assembly and the brake may operate based on electrical power. The spindle drive assembly may be indirectly connected to the collector head via a spring.

In an embodiment, a method for providing vehicle guidance may include receiving, at a controller comprising one or more processors, one or more sensor signals generated by a set of guidance sensors mounted on a pantograph and spaced apart along a lateral width of the pantograph. The pantograph may be installed on, or designed for installation on, a vehicle and thereby to conduct electrical energy from a conductive pathway as the vehicle travels along a route. The method may include determining, via the controller, a lateral position of the conductive pathway relative to the pantograph based on the one or more sensor signals that are received.

The method may include controlling a display device to present a visual indicium to an operator of the vehicle. The visual indicium may indicate the lateral position of the conductive pathway relative to the pantograph. The display device may include a set of lights spaced apart in a row. The step of controlling the display device to present the visual indicium may include selectively activating only a subset of one or more of the lights in the row. The method may include controlling a display device, based on the lateral position of the conductive pathway relative to the pantograph, to present visual indicium that indicates a lateral direction for the vehicle to move for centering the conductive pathway relative to the pantograph.

The method may include controlling a display device to present a visual indicium to an operator of the vehicle based on the lateral position, and modifying a location, a shape, a color, a timing, and/or an intensity of the visual indicium based on a detected change in the lateral position. The method may include determining that the lateral position of the conductive pathway is outside of a central region of the pantograph, and generating a control signal that automatically steers the vehicle in a direction to cause the central region of the pantograph to align with the conductive pathway.

The method may include determining that the lateral position of the conductive pathway is within a designated proximity of a first edge or an opposite second edge of the pantograph along the lateral width of the pantograph. In response to the determining step, the method may include (i) controlling a spindle drive assembly of the pantograph to change an amount of force exerted by the spindle drive assembly; (ii) generating an alert to notify an operator; (iii) electrically disconnecting the pantograph from an electrical system onboard the vehicle; and/or (iv) retracting the pantograph towards the vehicle and away from the conductive pathway.

In an embodiment, a vehicle may include a pantograph, guidance sensors, a controller including one or more processors, and a display device. The pantograph may receive electrical energy from a conductive pathway as the vehicle travels along a route. The guidance sensors may be mounted to the pantograph and spaced apart along a lateral width of the pantograph. The controller may receive sensor signals generated by the guidance sensors, and determine a lateral position of the conductive pathway relative to the pantograph based on the sensor signals. The display device may be disposed within a cab of the vehicle and communicatively coupled with the controller. The controller may control the display device to present a visual indicium to an operator of the vehicle based on the position of the conductive pathway relative to the pantograph.

In some embodiments, the system can determine and/or indicate a height distance relative to the conductive pathway rather than a left/right lateral indication. In addition, the display device may indicate other structures and equipment beyond just alignment of the pantograph to the conductive pathway. This may be accomplished using collision avoidance techniques (LIDAR, time of flight (ToF), optical sensors, etc.) or other sensor packages. This may be done in addition to indicating the alignment with the conductive pathway. In one embodiment, the controller may interact with a vehicle controller to adjust the vehicle vector to maintain a determined alignment configuration.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such claims are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the appended claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle guidance system comprising:
   at least one guidance sensor that is configured to mount on or adjacent to a pantograph along a lateral width of the pantograph, the pantograph being configured to install on a vehicle and to conduct electrical energy from a conductive pathway as the vehicle travels along a route; and
   a controller comprising one or more processors, the controller configured to receive one or more sensor signals generated by the at least one guidance sensor and to determine a lateral position of the conductive pathway relative to the pantograph based on the one or more sensor signals,
   wherein the pantograph comprises a spindle drive assembly, and the controller is configured to control the spindle drive assembly to change an amount of force exerted by the spindle drive assembly in response to determining that the lateral position of the conductive pathway is within a designated proximity of a first edge or an opposite second edge of the pantograph along the lateral width of the pantograph.

2. The vehicle guidance system of claim 1, wherein the at least one guidance sensor comprises multiple guidance sensors mounted on the pantograph and spaced apart along the lateral width of the pantograph.

3. The vehicle guidance system of claim 1, wherein the controller is configured to control a display device to present a visual indicium to an operator of the vehicle, the visual indicium indicating the lateral position of the conductive pathway relative to the pantograph.

4. The vehicle guidance system of claim 3, wherein the display device comprises a set of lights, the lights of the set spaced apart in a row, the controller configured to control the set of lights to present the visual indicium by selectively activating only a subset of one or more of the lights in the row.

5. The vehicle guidance system of claim 1, wherein the controller is configured to control a display device to present a visual indicium to an operator of the vehicle based on the lateral position that is determined, the visual indicium indicating a lateral direction for the vehicle to move for centering the conductive pathway relative to the pantograph.

6. The vehicle guidance system of claim 1, wherein the controller is configured to control a display device to present a visual indicium to an operator of the vehicle based on the lateral position of the conductive pathway relative to the pantograph,
the controller further configured to receive one or more updated sensor signals generated by the at least one guidance sensor and to modify one or more of a location, a shape, a color, a timing, or an intensity of the visual indicium based on a detected change in the lateral position based on the one or more updated sensor signals.

7. The vehicle guidance system of claim 1, wherein the controller is configured to determine that the lateral position of the conductive pathway is outside of a central region of the pantograph, and, in response, to generate a control signal that automatically steers the vehicle in a direction to cause the central region of the pantograph to align with the conductive pathway.

8. The vehicle guidance system of claim 1, wherein, in response to the controller determining that the lateral position is within a designated proximity of a first edge or an opposite second edge of the pantograph along the lateral width of the pantograph, the controller is configured to one or more of (i) generate an alert to notify an operator, (ii) electrically disconnect the pantograph from an electrical system onboard the vehicle, or (iii) retract the pantograph away from the conductive pathway.

9. The vehicle guidance system of claim 1, further comprising the pantograph, wherein the pantograph includes a collector head, a spindle drive assembly, and a brake, the controller configured to actuate the spindle drive assembly to selectively extend the pantograph to an extended position and retract the pantograph to a retracted position, the brake configured to prohibit movement of the pantograph relative to the vehicle unless deactivated by the controller.

10. The vehicle guidance system of claim 1, wherein a first guidance sensor of the at least one guidance sensor is a non-contact inductive sensor and the one or more sensor signals generated by the first guidance sensor indicate a proximity of the conductive pathway to the first guidance sensor.

11. The vehicle guidance system of claim 1, wherein the conductive pathway is a catenary line.

12. A method comprising:
receiving, at a controller comprising one or more processors, one or more sensor signals generated by at least one guidance sensor configured to be mounted on a pantograph along a lateral width of the pantograph, the pantograph configured for installation on a vehicle and thereby to conduct electrical energy from a conductive pathway as the vehicle travels along a route;
determining, via the controller, a lateral position of the conductive pathway relative to the pantograph based on the one or more sensor signals that are received; and
determining that the lateral position of the conductive pathway is within a designated proximity of a first edge or an opposite second edge of the pantograph along the lateral width of the pantograph; and, in response, one or more of:
controlling a spindle drive assembly of the pantograph to change an amount of force exerted by the spindle drive assembly;
generating an alert to notify an operator;
electrically disconnecting the pantograph from an electrical system onboard the vehicle; or
retracting the pantograph away from the conductive pathway.

13. The method of claim 12, further comprising controlling a display device to present a visual indicium to an operator of the vehicle, the visual indicium indicating the lateral position of the conductive pathway relative to the pantograph.

14. The method of claim 13, wherein the display device comprises a set of lights spaced apart in a row, and controlling the display device to present the visual indicium comprises selectively activating only a subset of one or more of the lights in the row.

15. The method of claim 12, further comprising controlling a display device, based on the lateral position of the conductive pathway relative to the pantograph, to present a visual indicium that indicates a lateral direction for the vehicle to move for centering the conductive pathway relative to the pantograph.

16. The method of claim 12, further comprising:
controlling a display device to present a visual indicium to an operator of the vehicle based on the lateral position;
receiving one or more updated sensor signals generated by the at least one guidance sensor; and
modifying one or more of a location, a shape, a color, a timing, or an intensity of the visual indicium based on a detected change in the lateral position based on the one or more updated sensor signals.

17. The method of claim 12, further comprising:
determining that the lateral position of the conductive pathway is outside of a central region of the pantograph; and
generating a control signal configured to automatically steer the vehicle in a direction to cause the central region of the pantograph to align with the conductive pathway.

18. A vehicle guidance system comprising:
a pantograph that is configured to by mounted on a vehicle and to receive electrical energy from a conductive pathway as the vehicle travels along a route;
guidance sensors mounted to the pantograph and spaced along a lateral width of the pantograph; and a controller comprising one or more processors, the controller configured to receive sensor signals generated by the guidance sensors and to determine a lateral position of the conductive pathway relative to the pantograph based on the sensor signals, the controller configured to control a display device to present a visual indicium to an operator of the vehicle based on the lateral position of the conductive pathway relative to the pantograph, wherein the controller is further configured to receive one or more updated sensor signals generated by the guidance sensors and to modify one or more of a location, a shape, a color, a timing, or an intensity of the visual indicium based on a detected a change in the lateral position based on the one or more updated sensor signals.

* * * * *